United States Patent
Shin et al.

(10) Patent No.: US 11,943,581 B2
(45) Date of Patent: Mar. 26, 2024

(54) TRANSPARENT AUDIO MODE FOR VEHICLES

(71) Applicant: Google LLC, Mountain View, CA (US)

(72) Inventors: Dongeek Shin, Santa Clara, CA (US); Jian Guo, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/449,557

(22) Filed: Sep. 30, 2021

(65) Prior Publication Data

US 2023/0096496 A1 Mar. 30, 2023

(51) Int. Cl.
*H04R 1/32* (2006.01)
*G06V 20/56* (2022.01)
*H04R 1/40* (2006.01)

(52) U.S. Cl.
CPC ............ *H04R 1/326* (2013.01); *G06V 20/56* (2022.01); *H04R 1/406* (2013.01); *H04R 2499/13* (2013.01)

(58) Field of Classification Search
CPC .... H04R 1/326; H04R 1/406; H04R 2499/13; G06V 20/56
USPC .......................................................... 381/56
See application file for complete search history.

(56) References Cited

U.S. PATENT DOCUMENTS

| | | |
|---|---|---|
| 2010/0033313 A1 | 2/2010 | Keady et al. |
| 2013/0259254 A1* | 10/2013 | Xiang ............... H04K 3/45 381/73.1 |
| 2015/0137998 A1 | 5/2015 | Marti et al. |
| 2018/0132052 A1* | 5/2018 | Muench ............. H04R 3/005 |
| 2021/0107477 A1 | 4/2021 | Kim et al. |
| 2021/0109187 A1 | 4/2021 | Watt et al. |

FOREIGN PATENT DOCUMENTS

WO 2020142597 A1 7/2020

OTHER PUBLICATIONS

Adel et al., "Beamforming Techniques for Multichannel audio Signal Separation", 2012, 9 pgs. Applicant points out, in accordance with MPEP 609.04(a), that the year of publication, 2012, is sufficiently earlier than the effective U.S. filing date, so that the particular month of publication is not in issue.
Gavrila et al., "Real-Time Object Detection for "Smart" Vehicles", Feb. 1999, Conference: Computer Vision, 7 pgs.
(Continued)

*Primary Examiner* — Vivian C Chin
*Assistant Examiner* — Douglas J Suthers
(74) *Attorney, Agent, or Firm* — Shumaker & Sieffert, P.A.

(57) ABSTRACT

In general, techniques are described by which to enable a transparency mode in vehicles. A device comprising one or more microphones and one or more processors may be configured to perform the techniques. The microphones may capture audio data representative of a sound scene external to a vehicle. The processors may perform beamforming with respect to the audio data to obtain object audio data representative of an audio object in the sound scene external to the vehicle. The processors may next reproduce, by interfacing with one or more speakers included within the vehicle and based on the object audio data, the audio object in the sound scene external to the vehicle.

17 Claims, 5 Drawing Sheets

(56) References Cited

OTHER PUBLICATIONS

Barak et al., "Microphone Array Optimization for Autonomous-Vehicle Audio Localization Based on the Radon Transform", Nov. 2020, 5 pgs.
Ristimaki, "Distributed Microphone Array System for Two-way Audio Communication", Jan. 2009, 74 pgs.
Invitation to Pay Additional Fees and, Where Applicable, Protest Fee from International Application No. PCT/US2022/072725 dated Oct. 4, 2022, 10 pp.
International Search Report and Written Opinion of International Application No. PCT/US2022/072725 dated Nov. 25, 2022, 16 pp.

* cited by examiner

TRANSPARENT AUDIO MODE FOR VEHICLES

BACKGROUND

Many vehicles are equipped with entertainment or infotainment systems, which reproduce a soundfield, based on audio data (or in other words, audio signals), via loudspeakers. While the reproduction of the soundfield by the infotainment system may increase immersion for occupants of the vehicle, such reproduction of the soundfield may diminish the ability of the operator of the vehicle (e.g., a driver of an automobile) to identify possible issues in an environment in which the operator is operating the vehicle. That is, in addition to road noise resulting from operating the vehicle at speed, the operator of the vehicle may have even further reduced awareness of the environment in which the vehicle is being operated. Such diminished awareness may result in potential safety hazards (e.g., as the operator may not hear sirens, bicycles, pedestrians, etc. due to road noise and the addition of the soundfield reproduced by the infotainment system via the loudspeakers).

SUMMARY

In general, techniques are described for providing a transparent audio mode in vehicles. A vehicle may include a head unit or other computing device that monitors an environment in which the vehicle operates. For example, the vehicle may include microphones externally disposed around a body of the vehicle, where such microphones capture audio signals (or, in other words, audio data) representative of a sound scene external to the vehicle. The vehicle may then perform beamforming with respect to the audio data to obtain object audio data representative of an audio object in the sound scene external to the vehicle. The vehicle may then reproduce, via one or more speakers within the vehicle and based on the object audio data, the audio object (possibly mixing the reproduced audio object with other audio content, such as audio content from the head unit).

In this way, various aspects of the techniques may increase awareness by an operator of the vehicle through external audio object identification and reproduction internally within the vehicle. For example, the vehicle may identify as audio objects a pedestrian, bicycle, cross vehicular traffic, sirens, horns, etc. and reproduce such audio objects internally within the vehicle to bring operator attention to potential safety hazards that may impact operation of the vehicle. Reducing and potentially avoiding safety hazards may allow the vehicle to operate more safely in difficult situations (e.g., where various objects are occluded but considering the deflection properties of sound waves may be identified despite being occluded). As such, various aspects of the techniques may improve operation of the vehicle itself.

In one example, various aspects of the techniques are directed to a method comprising: capturing, by one or more microphones, audio data representative of a sound scene external to a vehicle; performing, by one or more processors, beamforming with respect to the audio data to obtain object audio data representative of an audio object in the sound scene external to the vehicle; and reproducing, by one or more speakers included within the vehicle and based on the object audio data, the audio object in the sound scene external to the vehicle.

In another example, various aspects of the techniques are directed to a device comprising: one or more microphones configured to capture audio data representative of a sound scene external to a vehicle; and one or more processors configured to: perform beamforming with respect to the audio data to obtain object audio data representative of an audio object in the sound scene external to the vehicle; and reproduce, by interfacing with one or more speakers included within the vehicle and based on the object audio data, the audio object in the sound scene external to the vehicle.

In another example, various aspects of the techniques are directed to a non-transitory computer-readable storage medium having instructions stored thereon that, when executed, cause one or more processors to: obtain audio data representative of a sound scene external to a vehicle; perform beamforming with respect to the audio data to obtain object audio data representative of an audio object in the sound scene external to the vehicle; and reproduce, by interfacing with one or more speakers included within the vehicle and based on the object audio data, the audio object in the sound scene external to the vehicle.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
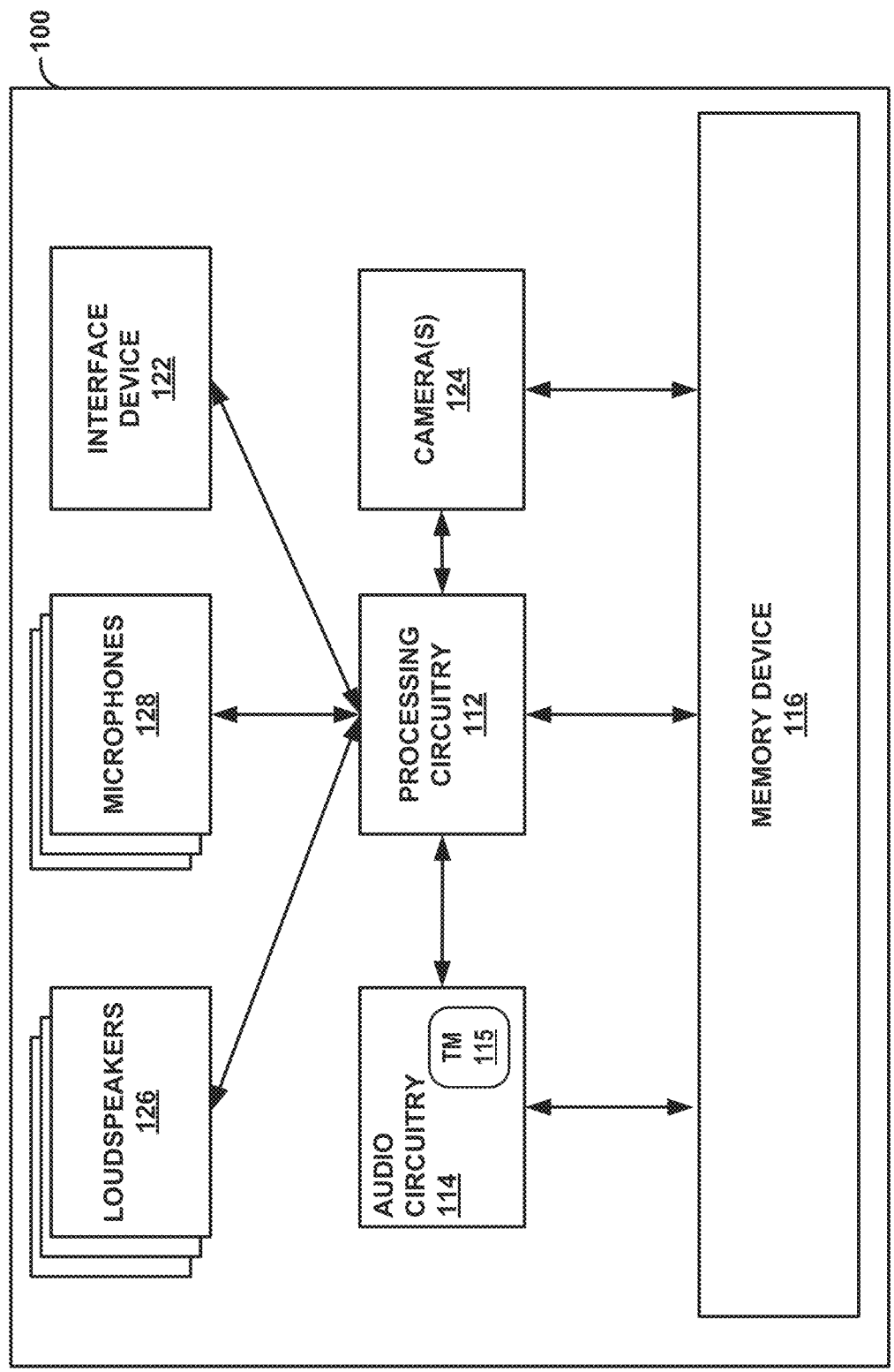
FIG. 1 is a block diagram illustrating an example vehicle configured to perform various aspects of the transparent audio mode techniques described in this disclosure.

FIG. 1 is a block diagram illustrating an example vehicle configured to perform various aspects of the transparent audio mode techniques described in this disclosure. Vehicle 100 is assumed in the description below to be an automobile. However, the techniques described in this disclosure may apply to any type of vehicle capable of conveying occupant(s) in a cabin, such as a bus, a recreational vehicle (RV), a semi-trailer truck, a tractor or other type of farm equipment, a train car, a plane, a personal transport vehicle, and the like.

In the example of FIG. 1, the vehicle 100 includes processing circuitry 112, an audio circuitry 114, and a memory device 116. In some examples, processing circuitry 112 and audio circuitry 114 may be formed as an integrated circuit (IC). For example, the IC may be considered as a processing chip within a chip package, and may be a system-on-chip (SoC).

Examples of processing circuitry 112 and audio circuitry 114 include, but are not limited to, one or more digital signal processors (DSPs), general purpose microprocessors, application specific integrated circuits (ASICs), field programmable logic arrays (FPGAs), fixed function circuitry, programmable processing circuitry, any combination of fixed function and programmable processing circuitry, or other equivalent integrated circuitry or discrete logic circuitry. Processing circuitry 112 may be the central processing unit (CPU) of the vehicle 100. In some examples, audio circuitry 114 may be specialized hardware that includes integrated and/or discrete logic circuitry that provides audio circuitry 114 with parallel processing capabilities.

Processing circuitry 112 may execute various types of applications, such as various occupant experience related applications including climate control interfacing applications, entertainment and/or infotainment applications, cellular phone interfaces (e.g., as implemented using Bluetooth® links), navigating applications, vehicle functionality interfacing applications, web or directory browsers, or other applications that enhance the occupant experience within the confines of the vehicle 100. The memory device 16 may store instructions for execution of the one or more applications.

Memory device 116 may include, be, or be part of the total memory for vehicle 100. Memory device 116 may comprise one or more computer-readable storage media. Examples of memory device 116 include, but are not limited to, a random access memory (RAM), an electrically erasable programmable read-only memory (EEPROM), flash memory, or other medium that can be used to carry or store desired program code in the form of instructions and/or data structures and that can be accessed by a computer or one or more processors (e.g., processing circuitry 112 and/or audio circuitry 114).

In some aspects, memory device 116 may include instructions that cause processing circuitry 112 and/or audio circuitry 114 to perform the functions ascribed in this disclosure to processing circuitry 112 and/or audio circuitry 114. Accordingly, memory device 16 may be a computer-readable storage medium having instructions stored thereon that, when executed, cause one or more processors (e.g., processing circuitry 112 and/or audio circuitry 114) to perform various functions.

Memory device 116 is a non-transitory storage medium. The term "non-transitory" indicates that the storage medium is not embodied in a carrier wave or a propagated signal. However, the term "non-transitory" should not be interpreted to mean that memory device 116 is non-movable or that its contents are static. As one example, memory device 116 may be removed from vehicle 100, and moved to another device. As another example, memory, substantially similar to memory device 116, may be inserted into one or more receiving ports of vehicle 100. In certain examples, a non-transitory storage medium may store data that can, over time, change (e.g., in RAM).

As further shown in the example of FIG. 1, the vehicle 100 may include an interface device 122, camera(s) 124, multiple microphones 128, and one or more loudspeakers 126. In some examples, interface device 122 may include one or more microphones that are configured to capture audio data of spoken commands provided by occupants of vehicle 100. In some examples, interface device 122 may include an interactive input/output display device, such as a touchscreen or other presence sensitive display. For instance, display devices that can form a portion of interface device 122 may represent any type of passive screen on which images can be projected, or an active screen capable of projecting images (such as a light emitting diode (LED) display, an organic LED (OLED) display, liquid crystal display (LCD), or any other type of active display), with input-receiving capabilities built in.

Although shown as a single device in FIG. 1 for ease of illustration, interface device 122 may include multiple user-facing devices that are configured to receive input and/or provide output. In various examples, interface device 122 may include displays in wired or wireless communication with vehicle 100, such as a heads-up display, a head-mounted display, an augmented reality computing device (such as "smart glasses"), a virtual reality computing device or display, a laptop computer or netbook, a mobile phone (including a so-called "smartphone"), a tablet computer, a gaming system, or another type of computing device capable of acting as an extension of or in place of a display integrated into vehicle 100.

Interface device 122 may represent any type of physical or virtual interface with which a user may interface to control various functionalities of vehicle 100. Interface device 122 may include physical buttons, knobs, sliders or other physical control implements. Interface device 122 may also include a virtual interface whereby an occupant of vehicle 100 interacts with virtual buttons, knobs, sliders or other virtual interface elements via, as one example, a touch-sensitive screen. Occupant(s) may interface with interface device 122 to control one or more of a climate within vehicle 100, audio playback by vehicle 100, video playback by vehicle 100, transmissions (such as cell phone calls) through vehicle 100, or any other operation capable of being performed by vehicle 100.

The interface device 122 may also represent interfaces extended from vehicle 100 when acting as an extension of or in place of a display integrated into vehicle 100. That is, interface device 122 may include virtual interfaces presented via the above noted HUD, augmented reality computing device, virtual reality computing device or display, tablet computer, or any other of the different types of extended displays listed above. Vehicle 100 may include a steering wheel for controlling a direction of travel of vehicle 100, one or more pedals for controlling a rate of travel of vehicle 100, one or more hand brakes, etc. In some examples, the steering wheel and pedals may be included in a particular in-cabin vehicle zone of vehicle 100, such as in the driver zone or pilot zone.

For purposes of illustration, processing circuitry 112, audio circuitry 114 and interface device 122 may form or otherwise support operation of a so-called head unit (which may also be referred to as a vehicle head unit). As such, reference to a head unit may refer to a computing device integrated within vehicle 100 that includes processing circuitry 112, audio circuitry 114, and interface device 122. Processing circuitry 112 may execute an operating system (OS) having a kernel (which is an OS layer that facilitates interactions with underlying hardware of the head unit and other connected hardware components, and executes in protected OS space) that supports execution of applications in an application space provided by the OS.

Camera(s) 124 of vehicle 100 may represent one or more image and/or video capture devices configured to capture image data (where a sequence of image data may form video data). Vehicle 100 may include a single camera capable of capturing 360 degrees of image/video data, or multiple cameras configured to capture a portion of the surroundings of vehicle 100 (where each portion may be stitched together to form 360 degrees of image/video data). In some examples, cameras 124 may only capture discrete portions of (and not all portions necessary to form) 360 degrees of image/video data. In other examples, cameras 124 may enable capture of a three-dimensional image/video data representative of an entire visual scene surrounding vehicle 100.

Cameras 124 may be disposed in a single location on a body of vehicle 100 (e.g., a roof of vehicle 100) or multiple locations around the body of and externally directed from vehicle 100 to capture image/video data representative of an external visual scene in which vehicle 100 operates. Cameras 124 may assist in various levels of autonomous driving, safety systems (e.g., lane assist, dynamic cruise control, etc.), vehicle operation (e.g., backup cameras for assisting in backing up vehicle 100), and the like.

Microphones 128 of vehicle 100 may represent a microphone array representative of a number of different microphones 128 placed external to vehicle 100 in order to capture a sound scene of an environment within which vehicle 100 is operating. Microphones 128 may each represent a transducer that converts sound waves into electrical signals (which may be referred to as audio signals, and when processed into digital signals, audio data). One or more of microphones 128 may represent reference microphones and/or error microphones for performing audio signal processing (e.g., wind noise cancellation, active noise cancellation, etc.).

Loudspeakers 126 represent components of the vehicle 100 that reproduce a soundfield based on audio signals provided directly or indirectly by processing circuitry 112 and/or audio circuitry 114. For instance, loudspeakers 126 may generate pressure waves based on one or more electrical signals received from processing circuitry 112 and/or audio circuitry 114. Loudspeakers 126 may include various types of speaker hardware, including full-range driver-based loudspeakers, individual loudspeakers that include multiple range-specific dynamic drivers, or loudspeakers that include a single dynamic driver such as a tweeter or a woofer.

Audio circuitry 114 may be configured to perform audio processing with respect to audio signals/audio data captured via microphones 128 in order to drive loudspeakers 126. Audio circuitry 114 may also receive audio signals/audio data from processing circuitry 112 that audio circuitry 114 may process in order to drive loudspeakers 126. The term "drive" as used herein may refer to a process of providing audio signals to loudspeakers 126, which includes a driver by which to convert the audio signals into pressure waves (which is another way of referring to sound waves). The term "drive" refers to providing such audio signals to the driver of loudspeakers 126 in order to reproduce a soundfield (which is another way of referring to a sound scene) represented by the audio signals.

Many vehicles, such as vehicle 100, are equipped with entertainment or infotainment systems, which reproduce a soundfield, based on audio data (or in other words, audio signals), via loudspeakers, such as loudspeakers 126. While the reproduction of the soundfield by the infotainment system may increase immersion for occupants of the vehicle, such reproduction of the soundfield may diminish the ability of the operator of the vehicle (e.g., a driver of an automobile) to identify possible issues in an environment in which the operator is operating the vehicle. That is, in addition to road noise resulting from operating the vehicle at speed, the operator of the vehicle may have even further reduced awareness of the environment in which the vehicle is being operated. Such diminished awareness may result in potential safety hazards (e.g., as the operator may not hear sirens, bicycles, pedestrians, etc. due to road noise and the addition of the soundfield reproduced by the infotainment system via the loudspeakers).

In accordance with various aspects of the techniques described in this disclosure, vehicle 100 may include microphones 128 externally disposed around a body of vehicle 100, where such microphones 128 capture audio signals (or, in other words, audio data) representative of a sound scene external to vehicle 100. Processing circuitry 112 may receive such audio data from microphones 128 and provide the audio data to audio circuitry 114.

Audio circuitry 114 may, responsive to receiving the audio data, invoke a transparency module 115. Transparency module 115 ("TM 115") may represent a module that supports a transparent audio mode for vehicle 100, enabling reproduction of various audio objects in the externally captured sound scene to be reproduced internally within vehicle 100. Transparency module 115 may perform various types of audio signal processing in order to accurately reproduce the audio object internally within vehicle 100.

For example, transparency module 115 may perform beamforming with respect to the audio data to obtain object audio data representative of an audio object in the sound scene external to vehicle 100. Beamforming may refer to a number of audio signal processing algorithm by which to perform spatial filtering of audio data, usually involving combining audio signals from each of microphones 128 to extract (e.g., by constructive combining) the object audio data and reject (e.g., by destructive combining) interfering audio signals from each of microphones 128 according to spatial locations of microphones 128. Transparency module 115 may perform one or more pre-processing audio algorithms to remove (e.g., filter out) noise, such as ambient noise due to wind, weather, animals, etc.

In some instances, transparency module 115 may perform such beamforming concurrently in a number of different spatial directions to extract object audio data for multiple different audio objects of interest in the sound scene. In this respect, transparency module 115 may perform beamforming in multiple different directions with respect to the audio data to obtain two or more object audio data representative of two or more audio objects in the sound scene external to the vehicle.

Transparency module 115 may then interface with loudspeakers 126 to reproduce, based on the object audio data, the audio object. When existing audio data is being reproduced, such as audio data from processing circuitry 112 in support of entertainment/infotainment audio content being reproduced for consumption by occupants of vehicle 100, transparency module 115 may mix the reproduced audio object with such other audio content.

In some instances, transparency module 115 may also invoke cameras 124 to provide video data representative of the visual scene external to vehicle 100. Cameras 124 and/or processing circuitry 112 may perform object detection with respect to the video data to identify a location of the audio object in the visual scene external to vehicle 100. Processing circuitry 112 may utilize machine learning in order to train an object detection model to perform object detection. In some instances, the object detection model is trained off-line (e.g., at a manufacturer or other component provider) and installed within vehicle 100 (e.g., stored to memory 116). Some object detection models may involve a distance transform-based matching involving neural networks or other forms of artificial intelligence.

In any event, processing circuitry 112 may implement such object detection to identify a location of potential audio objects in the sound scene. For example, processing circuitry 112 may perform object detection to identify a location and/or direction of a pedestrian relative to vehicle 100.

Processing circuitry 112 may obtain a programmed location of each one of cameras 124 and a programmed width of field of each of cameras 124 to identify in which direction and/or at which location each potential audio object resides relative to vehicle 100.

Processing circuitry 112 may provide the identified location/direction to audio circuitry 114, which may pass such location/direction to transparency module 115. Transparency module 115 may then perform, based on the location/direction of the audio object, beamforming with respect to the audio data to obtain the object audio data representative of the audio object in the sound scene external to vehicle 100.

Moreover, transparency module 115 may, due to beamforming (and possibly visual object detection), which requires a programmed definition of locations of microphones 128, determine a direction at which the audio object resides within the three-dimensional (3D) sound scene in which vehicle 100 operates. Transparency module 115 may mix the reproduced audio object in such a manner that the audio object appears to audibly arrive from the direction in which the audio objects reside in the 3D sound scene. Transparency module 115 may spread the audio object across two or more speaker feeds (which may also be referred to as speaker channels) in order to place the audio object in locations at which loudspeakers 126 are not located (e.g., using vector based amplitude panning—VBAP, or other audio signal post-processing). Transparency module 115 may effectively generate virtual speakers at the location at which the audio object resides in the sound scene relative to vehicle 100 and reproduce the audio object as speaker feeds to one or more loudspeakers 126 (potentially mixing in additional audio content into the audio object speaker feeds) that drive one or more loudspeakers 126 to reproduce the audio object.

In this way, various aspects of the techniques may increase awareness by an operator of vehicle 100 through external audio object identification and reproduction internally within vehicle 100. For example, vehicle 100 may identify as audio objects a pedestrian, bicycle, cross vehicular traffic, sirens, horns, etc. and reproduce such audio objects internally within vehicle 100 to bring operator attention to potential safety hazards that may impact operation of vehicle 100. Reducing and potentially avoiding safety hazards may allow the vehicle to operate more safely in difficult situations (e.g., where various objects are occluded but considering the diffraction properties of sound waves may be identified despite being occluded). As such, various aspects of the techniques may improve operation of vehicle 100 itself.

Figure 2A:
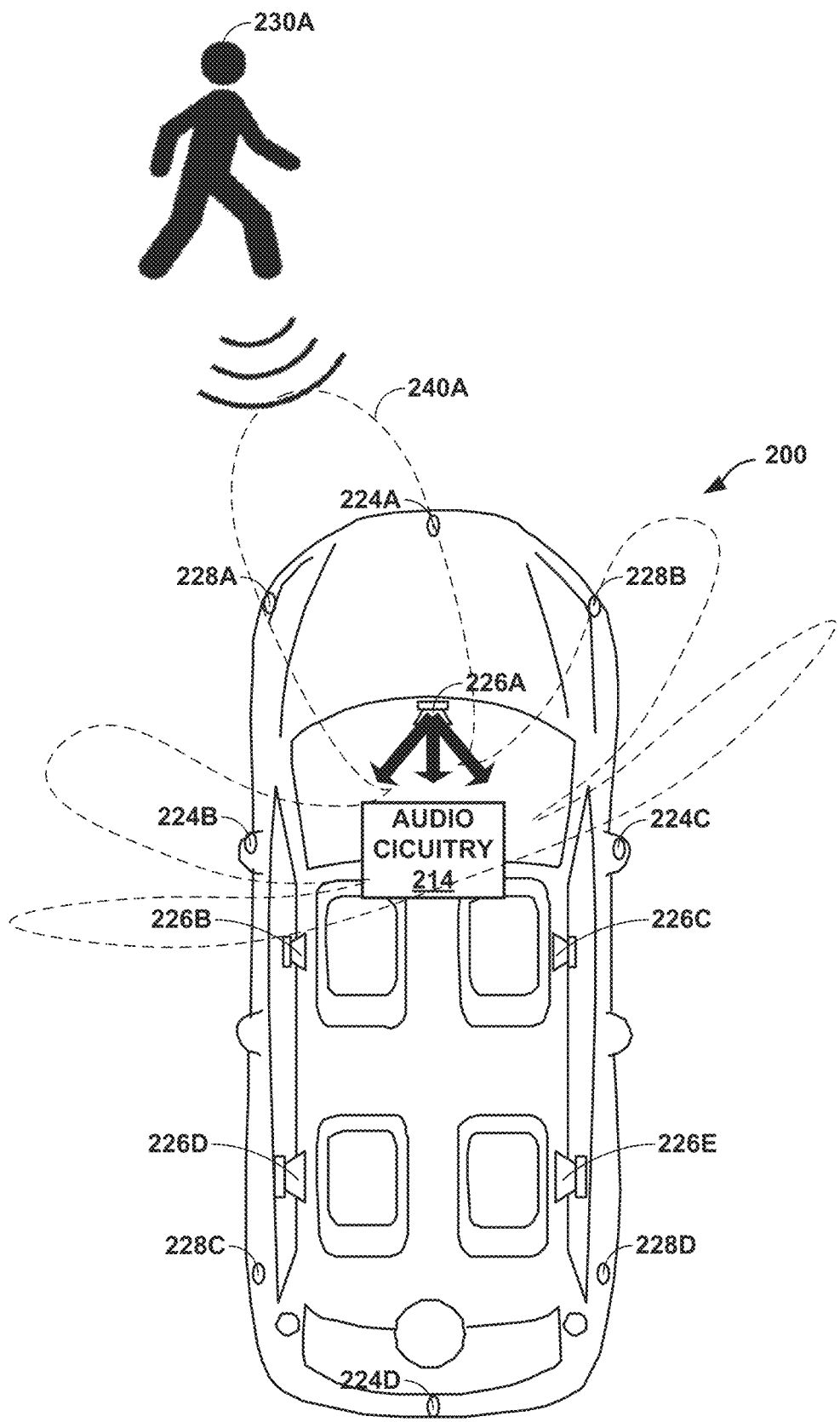
FIGS. 2A and 2B are diagrams illustrating a vehicle configured to implement a transparency mode in accordance with various aspects of the techniques described in this disclosure.
Figure 2B:
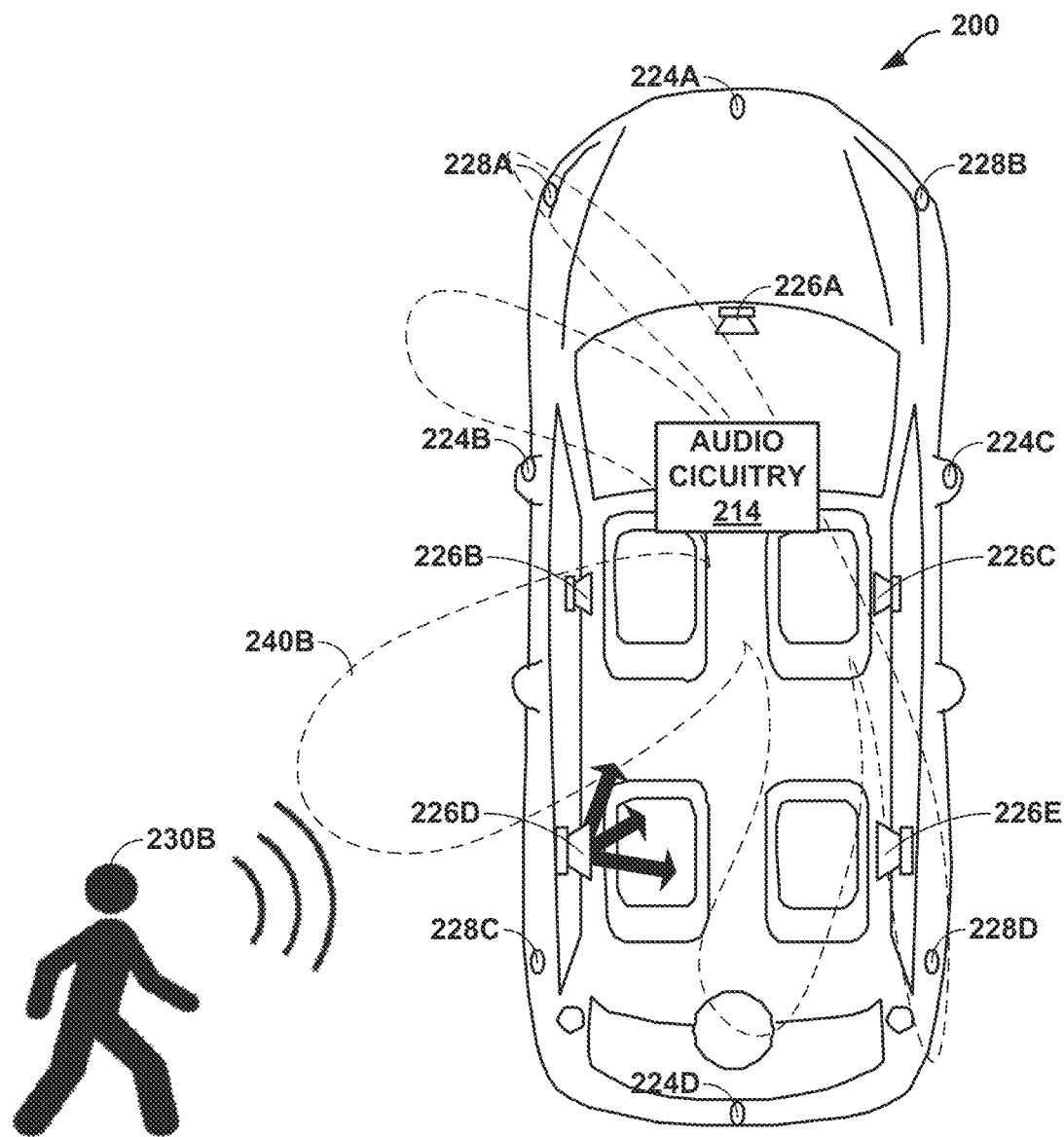

FIGS. 2A and 2B are diagrams illustrating a vehicle configured to implement a transparency mode in accordance with various aspects of the techniques described in this disclosure. As shown in the example of FIG. 2A, a vehicle 200 includes audio circuitry 214 that may represent an example of audio circuitry 114 described above with respect to the example of FIG. 1. As such, audio circuitry 214 may be configured to implement transparency module 115.

Vehicle 200 may represent an example of vehicle 100, where vehicle 200 includes four cameras 224A-224D ("cameras 224"), five loudspeakers 226A-226E ("loudspeakers 226"), and four microphones 228A-228D ("microphones 228"). Cameras 224 may represent examples of camera(s) 24. Loudspeakers 226 may represent examples of loudspeakers 126, while microphones 228 may represent examples of microphones 128. While described as having four cameras 224, five loudspeakers 226, and four microphones 228, vehicle 200 may include more or less of each of cameras 224, loudspeakers 226, and microphones 228.

In the example of FIG. 2A, camera 224A is disposed at a front of vehicle 200, while cameras 224B and 224C are disposed at the driver and passenger sides of vehicle 200. Camera 224D is disposed at a rear of vehicle 200. Loudspeakers 226 are disposed about a cabin of vehicle 200 in a common (5.1) configuration having a center channel, right and left channels and back right and back left channels (where the subwoofer is not shown for ease of illustration purposes). Microphones 228 are disposed at each corner of vehicle 200.

While shown in a particular location and/or arrangement, it should be understood that locations of cameras 224, loudspeakers 226 and microphones 228 can reside anywhere external to vehicle 200 or internal to vehicle 200. For example, cameras 224 are shown as externally located on the body of vehicle 200, but such cameras 224 may be internal to vehicle 200 but facing outward to capture the external visual scene in which vehicle 200 operates. Microphones 228 may, as another example, be located externally on the body of vehicle 200 but in different locations and/or arrangements. Loudspeakers 226, on the other hand, reside internal to vehicle 200 for purposes of reproducing sound scenes for occupants of vehicle 200, but may be arranged in different configurations to accommodate different intended use cases.

In any event, audio circuitry 214 may interface with microphones 228 to capture audio data representative of an external sound scene. In the example of FIG. 2A, a pedestrian 230A resides in the vicinity (e.g., within some threshold distance, such as 100, 200, 300, etc. feet) of vehicle 200 and forms part of an external sound scene in which vehicle 200 operates. Cameras 224 may capture the video data representative of the visual scene, where processing circuitry 112 may identify pedestrian 230A as a potential audio object and thereby determine a location/direction of pedestrian 230A relative to vehicle 200. Processing circuitry 112 may pass this location/direction of pedestrian 230A to transparency module 115 via audio circuitry 214.

Transparency module 115 may perform beamforming, based on the location/direction, to capture pedestrian 230A as an audio object in the sound scene represented by the audio data captured by microphones 228. Beamforming is denoted in the example of FIG. 2A as lobes 240A, where the main lobe is directed towards pedestrian 230A based on the location/direction identified via visual object detection. Lobes 240A also include secondary lobes on both sides of the main lobes that provide some diffuseness.

In other words, microphones 228 may fix a particular angle from which to capture audio data representative of the sound scene. Because the number of microphones 228 are finite (i.e., four in this example), the main lobe may have a non-impulse width, meaning that for a particular angle $\theta'$ there may be a slight ambiguity over a cone of $\delta\theta$ (so that a potential ground truth value is somewhere between $\theta'-\delta\theta$ and $\theta'+\delta\theta$).

Transparency module 115 may next perform such beamforming using a weighted delay and sum (WDAS) algorithm defined in accordance with the following equation:

$$y(k) = \Sigma_{n=0}^{N-1} w_n * x_n(k-\tau_n),$$

where the variable N denotes the number of microphones, the variable $w_n$ denotes amplitude weights that emphasis certain microphones 228 over others, the variable $x_n$ denotes the audio data provided by each of microphones 228, and the variable $\tau_n$ denotes independent delays for each microphone channel (which is another way to refer to audio data)

captured by microphones 228 to amplify the sum-microphone response at a target direction. The variable k denotes a current time. In some instances, the weights ($w_n$) and delays ($\tau_n$) are defined through offline calibration, e.g., at a factory or manufacturer.

Although described with respect to a WDAS algorithm, transparency module 115 may apply any other type of beamforming algorithm. Examples of other types of beamforming algorithms include a constant beamwidth broadband beamforming algorithm, a minimum variance distortionless response beamforming algorithm, a broadband constrained minimum variance beamforming algorithm, a statistical eigen beamforming algorithm, a beamspace beamforming algorithm, a near field adaptive beamforming algorithm, a frost beamforming algorithm, a near field acoustic beamforming algorithm, and a degenerate unmixing estimation technique (DUET) beamforming algorithm.

In any event, transparency module 115 may process audio data captured by microphones 228 disposed at different locations on the body of vehicle 200 to effectively filter and amplify (in the case of the WDAS algorithm) to form directed lobes 240A that target pedestrian 230A to extract object audio data representative of the audio object (i.e., pedestrian 230A in this example). Transparency module 115 may, in this way, perform beamforming with respect to the multi-channel audio data provided by microphones 228 to extract the object audio data.

Transparency module 115 may next assign a location to object audio data and render the object audio data to one or more loudspeaker feeds used to drive one or more corresponding loudspeakers 226. As noted above, transparency module 115 may perform vector-based amplitude panning or other audio signal processing algorithms for generating virtual speakers such that reproduction, based on the object audio data, of the audio object at the location relative to vehicle 200 from which the audio objects reside in the sound scene relative to vehicle 200.

In this example, transparency module 115 may assign a forward center location to pedestrian 230A and generate a center channel speaker feed that drives front center speaker 226A (and possible one or more additional speakers of speakers 226, which may also be referred to as a speaker array) to reproduce the audio object (again, pedestrian 230A in this example). Transparency module 115 may mix the rendered audio data (e.g., a speaker feed) with an existing front center channel speaker feed (that may include audio content from the infotainment system, which may also be referred to as the head unit).

In this respect, transparency module 115 may select a subset of the one or more loudspeakers 226 that are capable of reproducing the audio object in a direction in which the audio object is relative to vehicle 200 (where subset is used to mean one or more but not all, and is not intended to denote the classical mathematical definition of subset that can include zero or all items of the entire set). Moreover, transparency module 115 may reproduce, by interfacing with the subset of the one or more speakers 226 (which is another way to refer to loudspeakers 226) and based on the object audio data, the audio object.

Referring next to the example of FIG. 2B, audio circuitry 214 of vehicle 200 may perform beamforming (as denoted by lobes 240B) in a different direction responsive to identifying a new audio object representative of a pedestrian 230B. Audio circuitry 214 may invoke transparency module 115 to perform such beamforming in the manner described above and render, based on identification of the location/direction (e.g., by way of cameras 224 and/or microphones 228) and extracted object audio data, speaker feeds for driving a back left loudspeaker 226D. Again, transparency module 115 may mix existing back left speaker feeds (for other audio content) with the speaker feed rendered from the extracted object audio data.

While shown as only performing beamforming in one direction in both of the examples of FIGS. 2A and 2B, transparency module 115 may perform beamforming in multiple different directions with respect to the audio data captured by microphones 228 to obtain two or more object audio data representative of two or more audio objects (e.g., pedestrian 230A and 230B) in the sound scene external to vehicle 200. Such beamforming in multiple directions may occur concurrently (and potentially simultaneously) as the microphone channels are captured a single time (or, in other words, only once) and transparency module 115 may perform beamforming on board vehicle 200 and in near-real-time or real-time (e.g., with minimal processing delay). Such real-time or near-real-time beamforming may allow transparency module 115 to perform a current-time (except for possible minimal processing delay) reproduce audio objects in the sound scene to enable a clear pass-through audio experience.

Figure 3:
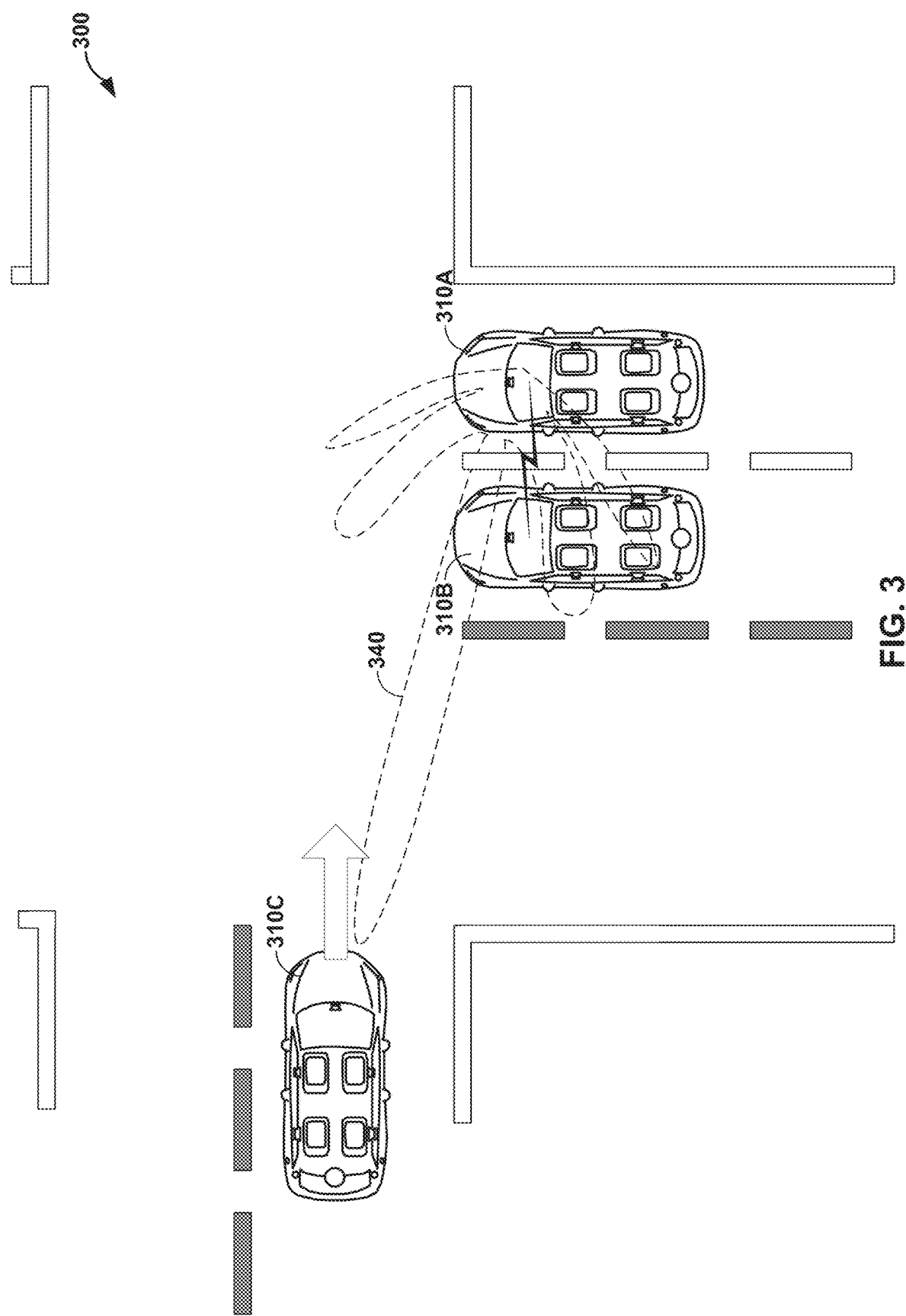
FIG. 3 is a diagram illustrating a potential safety hazard detected via application of a transparent mode by a vehicle in accordance with various aspects of the techniques described in this disclosure.

FIG. 3 is a diagram illustrating a potential safety hazard detected via application of a transparent mode by a vehicle in accordance with various aspects of the techniques described in this disclosure. In the example of FIG. 3, a system 300 is shown that includes vehicles 310A-310C. Vehicle 310A may represent an example of vehicle 100 shown in the example of FIG. 1 and/or vehicle 200 shown in the examples of FIGS. 2A and 2B, which may be configured to perform various aspects of the transparency mode techniques described in this disclosure.

System 300 depicts an intersection in which vehicle 310C is traveling from left to right at some speed (e.g., 25 miles per hour—MPH, 30 MPH, 45 MPH, 55 MPH, etc.). By virtue of traveling at such a speed, vehicle 310C may produce noise, e.g., road noise, wind noise, engine noise (for internal combustion engines), simulated engine noise (for electric vehicles), etc. As such, vehicle 310C may represent another vehicle in a sound scene in which vehicle 310A operates. Vehicle 310A may capture via microphones (e.g., microphones 228) audio data representative of the sound scene, performing beamforming in the manner described above to extract object audio data representative of vehicle 310C. Such beamforming is illustrated by lobes 340.

As further shown in the example of FIG. 3, vehicle 310B may at least partially occlude view of vehicle 310C by vehicle 310A, presenting a significant safety hazard (e.g., a potential accident) should vehicle 310A pull into the intersection in front of vehicle 310C. Further, even should vehicle 310A incorporate safety equipment, such as cameras, light detection and ranging (LIDAR), and/or radio detection and ranging (RADAR), may be unable to detect vehicle 310C due to vehicle 310B occluding such safety equipment of vehicle 310A.

However, given that sound (from vehicle 310C) is different than LIDAR/RADAR because sound has diffractive and diffuse properties over space (e.g., sound can be heard behind walls and occlusions), transparency module 115 of vehicle 310A may detect and extract object audio data for vehicle 310C in the sound scene (using beamforming) and thereby reproduce the audio object (and/or alert from the similar direction) via internal loudspeakers to allow the operator of vehicle 310A to be aware of fast approaching vehicle 310C. As such, transparency module 115 may improve safety while operating vehicle 310A as the operator of vehicle 310A may take appropriate action (e.g., break to avoid entering the intersection) to prevent an accident with vehicle 310C.

Furthermore, in some instances, interface 122 (described above with respect to the example of FIG. 1) may provide for vehicle to vehicle (V2V) communication and/or vehicle to everything (V2X) communication to transmit object audio data to nearby cars or other computing devices (such as smartphones) that do not natively support such as transparency mode. Likewise, other vehicles, such as vehicle 310B may capture audio data and extract, via beamforming, object audio data that can be sent via V2V or V2X communication to a different vehicle, such as vehicle 310A. Vehicle 310B may provide such object audio data to vehicle 310A regarding vehicle 310C as vehicle 310B may provide object audio data having a better signal to noise ratio (SNR) given that there is no occlusion between vehicle 310B and vehicle 310A.

In addition, vehicles located further away from vehicle 310A may provide object audio data via V2V or V2X communication to facilitate better awareness of upcoming audio objects in distant sound scenes (e.g., sirens, accidents, traffic, etc.). As such, vehicle 310A may obtain, from a different vehicle, such as vehicle 310B, object audio data representative of an audio object in a sound scene external to vehicle 310B. The object audio data may specify a location or direction in which the audio object resides in the sound scent relative to vehicle 310B. Vehicle 310A may pass the audio object data to audio circuitry 114, which may reproduce, based on the audio object data, the audio object, and mix the reproduced audio object based on the location specified in the audio object data to accurately reproduce the location of the audio object in the sound scene relative to vehicle 310A.

Figure 4:
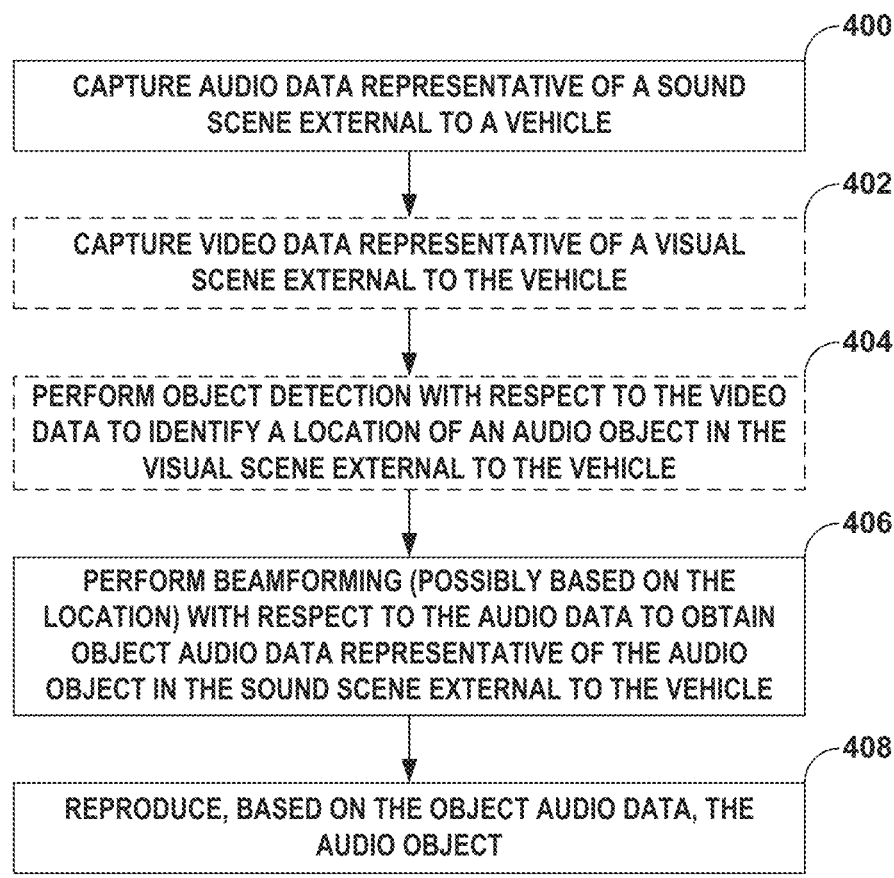
FIG. 4 is a flowchart illustrating example operation of the vehicle shown in the example of FIG. 1 in performing various aspects of the transparency mode techniques described in this disclosure.

FIG. 4 is a flowchart illustrating example operation of the vehicle shown in the example of FIG. 1 in performing various aspects of the transparency mode techniques described in this disclosure. As described above, vehicle 100 may include microphones 128 externally disposed around a body of vehicle 100, where such microphones 128 capture audio signals (or, in other words, audio data) representative of a sound scene external to vehicle 10 (400). Processing circuitry 112 may receive such audio data from microphones 128 and provide the audio data to audio circuitry 114.

Audio circuitry 114 may, responsive to receiving the audio data, invoke a transparency module 115. In some instances, transparency module 115 may optionally (as denoted by the dashed lines around box 402) also invoke cameras 124 to provide video data representative of the visual scene external to vehicle 100. Cameras 124 and/or processing circuitry 112 may perform object detection with respect to the video data to identify a location of the audio object in the visual scene external to vehicle 100 (404).

Processing circuitry 112 may provide the identified location/direction to audio circuitry 114, which may pass such location/direction to transparency module 115. Transparency module 115 may then perform beamforming (possibly based on the location/direction of the audio object) with respect to the audio data to obtain the object audio data representative of the audio object in the sound scene external to vehicle 100 406). In some instances, transparency module 115 may perform such beamforming concurrently in a number of different spatial directions to extract object audio data for multiple different audio objects of interest in the sound scene. In this respect, transparency module 115 may perform beamforming in multiple different directions with respect to the audio data to obtain two or more object audio data representative of two or more audio objects in the sound scene external to the vehicle.

Transparency module 115 may then interface with loudspeakers 126 to reproduce, based on the object audio data, the audio object (408). When existing audio data is being reproduced, such as audio data from processing circuitry 112 in support of entertainment/infotainment audio content being reproduced for consumption by occupants of vehicle 100, transparency module 115 may mix the reproduced audio object with such other audio content.

In this way, various aspects of the techniques may enable the following examples.

Example 1. A method comprising: capturing, by one or more microphones, audio data representative of a sound scene external to a vehicle; performing, by one or more processors, beamforming with respect to the audio data to obtain object audio data representative of an audio object in the sound scene external to the vehicle; and reproducing, by one or more speakers included within the vehicle and based on the object audio data, the audio object in the sound scene external to the vehicle.

Example 2. The method of example 1, wherein performing beamforming comprises performing beamforming in multiple different directions with respect to the audio data to obtain two or more object audio data representative of two or more audio objects in the sound scene external to the vehicle.

Example 3. The method of any combination of examples 1 and 2, wherein the vehicle is a first vehicle, and wherein the object audio data is representative of a second vehicle at least partially occluded from view by a driver of the first vehicle.

Example 4. The method of any combination of examples 1-3, wherein the object audio data is representative of one or more of a pedestrian, a bicyclist, and another vehicle.

Example 5. The method of any combination of examples 1-4, further comprising: capturing, by a camera, video data representative of a visual scene external to the vehicle, performing object detection with respect to the video data to identify a location of the audio object in the visual scene external to the vehicle, wherein performing beamforming comprises performing, based on the location of the audio object, beamforming with respect to the audio data to obtain the object audio data representative of the audio object in the sound scene external to the vehicle.

Example 6. The method of any combination of examples 1-5, wherein the one or more microphones comprise a first microphone and a second microphone, each of the first and second microphones located in different positions on a body of the vehicle, wherein capturing the audio data comprises: capturing, by the first microphone, first audio data representative of the sound scene external to the vehicle; and capturing, by the second microphone, second audio data representative of the sound scene external to the vehicle, and wherein performing beamforming comprises performing a weighted sum and delay algorithm with respect to the first audio data and the second audio data to obtain the object audio data representative of the audio object in the sound scene external to the vehicle.

Example 7. The method of any combination of examples 1-6, wherein performing beamforming comprises performing beamforming with respect to the audio data to obtain the object audio data representative of only the audio object in the sound scene and exclude any other object audio data representative of different audio objects in the sound scene at different locations, and wherein reproducing the audio object comprises reproducing, by the one or more speakers included within the vehicle and based on the object audio data, only the audio object in the sound scene.

Example 8. The method of any combination of examples 1-7, wherein reproducing the audio object comprises: selecting a subset of the one or more speakers that are capable of reproducing the audio object in a direction in which the audio object is relative to the vehicle; and reproducing, by the subset of the one or more speakers and based on the object audio data, the audio object.

Example 9. The method of any combination of examples 1-8, wherein a number of the one or more microphones is different than a number of the one or more speakers.

Example 10. The method of any combination of examples 1-9, wherein the vehicle comprises a first vehicle, wherein the object audio data comprises first object audio data representative of a first audio object in a first sound scene external to the first vehicle, and wherein the method further comprises: obtain, from a second vehicle, second object audio data representative of a second audio object in a second sound scene external to the second vehicle; and reproduce, by the one or more speakers included within the first vehicle and based on the second object audio data, the second audio object in the second sound scene external to the second vehicle.

Example 11. A device comprising: one or more microphones configured to capture audio data representative of a sound scene external to a vehicle; and one or more processors configured to: perform beamforming with respect to the audio data to obtain object audio data representative of an audio object in the sound scene external to the vehicle; and reproduce, by interfacing with one or more speakers included within the vehicle and based on the object audio data, the audio object in the sound scene external to the vehicle.

Example 12. The device of example 11, wherein the one or more processors are, when configured to perform beamform, configured to perform beamforming in multiple different directions with respect to the audio data to obtain two or more object audio data representative of two or more audio objects in the sound scene external to the vehicle.

Example 13. The device of any combination of examples 11 and 12, wherein the vehicle is a first vehicle, and wherein the object audio data is representative of a second vehicle at least partially occluded from view by a driver of the first vehicle.

Example 14. The device of any combination of examples 11-13, wherein the object audio data is representative of one or more of a pedestrian, a bicyclist, and another vehicle.

Example 15. The device of any combination of examples 11-14, further comprising a camera configured to capture video data representative of a visual scene external to the vehicle, wherein the one or more processors are further configured to perform object detection with respect to the video data to identify a location of the audio object in the visual scene external to the vehicle, wherein the one or more processors are, when configured to perform beamforming, configured to perform, based on the location of the audio object, beamforming with respect to the audio data to obtain the object audio data representative of the audio object in the sound scene external to the vehicle.

Example 16. The device of any combination of examples 11-15, wherein the one or more microphones comprise a first microphone and a second microphone, each of the first and second microphones located in different positions on a body of the vehicle, wherein the first microphone is, when configured to capture the audio data, configured to capture first audio data representative of the sound scene external to the vehicle; and wherein the second microphone is, when configured to capture the audio data, configured to capture second audio data representative of the sound scene external to the vehicle, and wherein the one or more processors are, when configured to perform beamforming, configured to perform a weighted sum and delay algorithm with respect to the first audio data and the second audio data to obtain the object audio data representative of the audio object in the sound scene external to the vehicle.

Example 17. The device of any combination of examples 11-16, wherein the one or more processors are, when configured to perform beamforming, configured to perform beamforming with respect to the audio data to obtain the object audio data representative of only the audio object in the sound scene and exclude any other object audio data representative of different audio objects in the sound scene at different locations, and wherein the one or more processors are, when configured to reproduce the audio object, configured to reproduce, by interfacing with the one or more speakers included within the vehicle and based on the object audio data, only the audio object in the sound scene.

Example 18. The device of any combination of examples 11-17, wherein the one or more processors are, when configured to reproduce the audio object, configured to: select a subset of the one or more speakers that are capable of reproducing the audio object in a direction in which the audio object is relative to the vehicle; and reproduce, by the subset of the one or more speakers and based on the object audio data, the audio object.

Example 19. The device of any combination of examples 11-18, wherein the vehicle comprises a first vehicle, wherein the object audio data comprises first object audio data representative of a first audio object in a first sound scene external to the first vehicle, and wherein the method further comprises: obtain, from a second vehicle, second object audio data representative of a second audio object in a second sound scene external to the second vehicle; and reproduce, by the one or more speakers included within the first vehicle and based on the second object audio data, the second audio object in the second sound scene external to the second vehicle.

Example 20. A non-transitory computer-readable storage medium having instructions stored thereon that, when executed, cause one or more processors to: obtain audio data representative of a sound scene external to a vehicle; perform beamforming with respect to the audio data to obtain object audio data representative of an audio object in the sound scene external to the vehicle; and reproduce, by interfacing with one or more speakers included within the vehicle and based on the object audio data, the audio object in the sound scene external to the vehicle.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method comprising:
    capturing, by one or more microphones, audio data representative of a sound scene external to a vehicle, wherein capturing the audio data comprises:
        capturing, by a first microphone of the one or more microphones, first audio data representative of the sound scene external to the vehicle; and
        capturing, by a second microphone of the one or more microphones, second audio data representative of the sound scene external to the vehicle, each of the first and second microphones located at different positions on a body of the vehicle;
    performing, by one or more processors, beamforming with respect to the first audio data and the second audio data to amplify the audio data originating from a particular direction relative to a position of the vehicle and obtain object audio data representative of an audio object in the sound scene external to the vehicle, wherein performing beamforming comprises performing, by the one or more processors, a weighted sum and delay algorithm with respect to the first audio data and the second audio data to obtain the object audio data representative of the audio object in the sound scene external to the vehicle; and
    reproducing, by one or more speakers included within the vehicle and based on the object audio data, the audio object in the sound scene external to the vehicle, wherein a number of the one or more microphones is different than a number of the one or more speakers.

2. The method of claim 1, wherein performing the weighted sum and delay algorithm comprises performing the weighted sum and delay algorithm in multiple different directions with respect to the first audio data and the second audio data to obtain two or more object audio data representative of two or more audio objects in the sound scene external to the vehicle.

3. The method of claim 1,
    wherein the vehicle is a first vehicle, and
    wherein the object audio data is representative of a second vehicle at least partially occluded from view by a driver of the first vehicle.

4. The method of claim 1, wherein the object audio data is representative of one or more of a pedestrian, a bicyclist, and another vehicle.

5. The method of claim 1, further comprising:
    capturing, by a camera, video data representative of a visual scene external to the vehicle,
    performing object detection with respect to the video data to identify a location of the audio object in the visual scene external to the vehicle,
    wherein performing beamforming comprises performing, based on the location of the audio object, beamforming with respect to the audio data to obtain the object audio data representative of the audio object in the sound scene external to the vehicle.

6. The method of claim 1,
    wherein performing beamforming comprises performing beamforming with respect to the audio data to obtain the object audio data representative of only the audio object in the sound scene and exclude any other object audio data representative of different audio objects in the sound scene at different locations, and
    wherein reproducing the audio object comprises reproducing, by the one or more speakers included within the vehicle and based on the object audio data, only the audio object in the sound scene.

7. The method of claim 1, wherein reproducing the audio object comprises:
    selecting a subset of the one or more speakers that are capable of reproducing the audio object in a direction in which the audio object is relative to the vehicle; and
    reproducing, by the subset of the one or more speakers and based on the object audio data, the audio object.

8. The method of claim 1
wherein the vehicle comprises a first vehicle,
wherein the method further comprises:
- obtaining, from a second vehicle, second object audio data representative of a second audio object in a second sound scene external to the second vehicle; and
- reproducing, by the one or more speakers included within the first vehicle and based on the second object audio data, the second audio object in the second sound scene external to the second vehicle.

9. A device comprising:
one or more microphones configured to capture audio data representative of a sound scene external to a vehicle, wherein capturing the audio data comprises:
- capturing, by a first microphone of the one or more microphones, first audio data representative of the sound scene external to the vehicle; and
- capturing, by a second microphone of the one or more microphones, second audio data representative of the sound scene external to the vehicle, each of the first and second microphones located at different positions on a body of the vehicle; and one or more processors configured to:
- perform beamforming with respect to the first audio data and the second audio data to amplify the audio data originating from a particular direction relative to a position of the vehicle and obtain object audio data representative of an audio object in the sound scene external to the vehicle, wherein to perform the beamforming, the one or more processors are configured to perform a weighted sum and delay algorithm with respect to the first audio data and the second audio data to obtain the object audio data representative of the audio object in the sound scene external to the vehicle; and
- reproduce, by interfacing with one or more speakers included within the vehicle and based on the object audio data, the audio object in the sound scene external to the vehicle, wherein a number of the one or more microphones is different than a number of the one or more speakers.

10. The device of claim 9, wherein the one or more processors are, when configured to perform beamform, configured to perform the weighted sum and delay algorithm in multiple different directions with respect to the first audio data and the second audio data to obtain two or more object audio data representative of two or more audio objects in the sound scene external to the vehicle.

11. The device of claim 9,
wherein the vehicle is a first vehicle, and
wherein the object audio data is representative of a second vehicle at least partially occluded from view by a driver of the first vehicle.

12. The device of claim 9, wherein the object audio data is representative of one or more of a pedestrian, a bicyclist, and another vehicle.

13. The device of claim 9, further comprising a camera configured to capture video data representative of a visual scene external to the vehicle,
wherein the one or more processors are further configured to perform object detection with respect to the video data to identify a location of the audio object in the visual scene external to the vehicle,
wherein the one or more processors are, when configured to perform beamforming, configured to perform, based on the location of the audio object, beamforming with respect to the audio data to obtain the object audio data representative of the audio object in the sound scene external to the vehicle.

14. The device of claim 9,
wherein the one or more processors are, when configured to perform beamforming, configured to perform beamforming with respect to the audio data to obtain the object audio data representative of only the audio object in the sound scene and exclude any other object audio data representative of different audio objects in the sound scene at different locations, and
wherein the one or more processors are, when configured to reproduce the audio object, configured to reproduce, by interfacing with the one or more speakers included within the vehicle and based on the object audio data, only the audio object in the sound scene.

15. The device of claim 9, wherein the one or more processors are, when configured to reproduce the audio object, configured to:
- select a subset of the one or more speakers that are capable of reproducing the audio object in a direction in which the audio object is relative to the vehicle; and
- reproduce, by the subset of the one or more speakers and based on the object audio data, the audio object.

16. The device of claim 9,
wherein the vehicle comprises a first vehicle,
wherein the one or more processors are further configured to:
- obtain, from a second vehicle, second object audio data representative of a second audio object in a second sound scene external to the second vehicle; and
- reproduce, by the one or more speakers included within the first vehicle and based on the second object audio data, the second audio object in the second sound scene external to the second vehicle.

17. A non-transitory computer-readable storage medium having instructions stored thereon that, when executed, cause one or more processors to:
- obtain audio data representative of a sound scene external to a vehicle, wherein capturing the audio data comprises:
  - capturing, by a first microphone of the one or more microphones, first audio data representative of the sound scene external to the vehicle; and
  - capturing, by a second microphone of the one or more microphones, second audio data representative of the sound scene external to the vehicle, each of the first and second microphones located at different positions on a body of the vehicle;
- perform beamforming with respect to the first audio data and the second audio data to amplify the audio data originating from a particular direction relative to a position of the vehicle and obtain object audio data representative of an audio object in the sound scene external to the vehicle, wherein to perform the beamforming, the instructions include instruction that, when executed, cause the one or more processors to perform a weighted sum and delay algorithm with respect to the first audio data and the second audio data to obtain the object audio data representative of the audio object in the sound scene external to the vehicle; and
- reproduce, by interfacing with one or more speakers included within the vehicle and based on the object audio data, the audio object in the sound scene external to the vehicle, wherein a number of the one or more microphones is different than a number of the one or more speakers.

\* \* \* \* \*